(12) United States Patent
Souveton

(10) Patent No.: US 12,234,790 B2
(45) Date of Patent: Feb. 25, 2025

(54) AIR INLET FOR AN AIRCRAFT PROPULSION UNIT COMPRISING MOBILE MEMBERS FOR PROMOTING A THRUST REVERSAL PHASE, AND METHOD FOR USING SUCH AN AIR INLET

(71) Applicant: SAFRAN AIRCRAFT ENGINES, Paris (FR)

(72) Inventor: Ulrick Souveton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/561,051

(22) PCT Filed: Jun. 2, 2022

(86) PCT No.: PCT/EP2022/065138
§ 371 (c)(1),
(2) Date: Nov. 15, 2023

(87) PCT Pub. No.: WO2022/263203
PCT Pub. Date: Dec. 22, 2022

(65) Prior Publication Data
US 2024/0254945 A1    Aug. 1, 2024

(30) Foreign Application Priority Data
Jun. 13, 2021    (FR) ........................................ 2106215

(51) Int. Cl.
*F02K 1/72*    (2006.01)
*F02C 7/04*    (2006.01)

(52) U.S. Cl.
CPC .................. *F02K 1/72* (2013.01); *F02C 7/04* (2013.01); *F05D 2220/323* (2013.01)

(58) Field of Classification Search
CPC ... F02K 1/72; F02K 1/763; F02K 1/66; F02C 7/04; F02C 7/042; F05D 2220/323; F05D 2260/74
See application file for complete search history.

(56) References Cited

U.S. PATENT DOCUMENTS

| | | | |
|---|---|---|---|
| 3,618,876 A | 11/1971 | Skidmore | |
| 2024/0209813 A1* | 6/2024 | Pascal | F02C 7/28 |

FOREIGN PATENT DOCUMENTS

| | | |
|---|---|---|
| FR | 2081027 | 11/1971 |
| FR | 3095241 | 10/2020 |
| WO | 2020212225 | 10/2020 |

OTHER PUBLICATIONS

International Search Report, International Application No. PCT/EP2022/065138, dated Sep. 21, 2022, 3 pages.

* cited by examiner

*Primary Examiner* — Valentina Xavier
(74) *Attorney, Agent, or Firm* — RANKIN, HILL & CLARK LLP

(57) ABSTRACT

An air inlet of an aircraft propulsion unit comprising thrust reversal means configured to modify a bypass air flow circulating from upstream to downstream in a bypass duct into a reverse air flow circulating from downstream to upstream. The air inlet comprising an interior wall defining openings and, in each opening, a mobile member that comprises a covering wall and a deflecting wall and is mounted so as to pivot between a covering position, in which the covering wall obstructs the opening so as to guide the bypass air flow and promote a thrust phase, and a deflecting position, in which the deflecting wall obstructs the opening so as to separate the reverse air flow and promote a thrust reversal phase.

13 Claims, 9 Drawing Sheets

AIR INLET FOR AN AIRCRAFT PROPULSION UNIT COMPRISING MOBILE MEMBERS FOR PROMOTING A THRUST REVERSAL PHASE, AND METHOD FOR USING SUCH AN AIR INLET

TECHNICAL FIELD

The present invention relates to the field of aircraft propulsion units and more particularly an air inlet for an aircraft propulsion unit.

In a known manner, in reference to FIG. 1A, an aircraft propulsion unit 800 extends along a longitudinal axis X oriented from upstream to downstream and comprises a turbine engine 700 and a nacelle 300. The turbine engine 700 extends along the longitudinal axis X and is configured to allow propulsion of the aircraft from the acceleration of an inner air flow F-INT circulating from upstream to downstream in the turbine engine 700. The nacelle 300 extends outwardly around the turbine engine 700 along the longitudinal axis X and makes it possible to guide the inner air flow F-INT in the turbine engine 700. Subsequently, the terms "upstream" and "downstream" are defined with respect to the orientation of the longitudinal axis X. The terms "inner" and "outer" in turn are defined along the radial direction with respect to the longitudinal axis X.

In a known manner, as shown in FIG. 1A, the turbine engine 700 is a bypass turbine engine and comprises upstream a fan 400 rotatably mounted about the longitudinal axis X to accelerate the inner air flow F-INT from upstream to downstream. The turbine engine 700 also comprises, downstream of the fan 400, a radially inner primary duct 500 and a radially outer bypass duct 600, which are configured to guide respectively a first portion of the inner air flow F-INT, known as the primary air flow F1, for fuel combustion, and a second portion of the inner air flow F-INT, known as the bypass air flow F2, in order to generate the thrust of the turbine engine 700.

In a known manner, still in reference to FIG. 1A, the nacelle 300 extends radially outwards to the fan 400 and radially outwardly delimits the bypass duct 600. The nacelle 300 comprises at its upstream end an air inlet 100 delimiting an annular cavity 113 of longitudinal axis X. The air inlet 100 comprises an inner wall 110 turned towards the longitudinal axis X and an outer wall 111 opposite the inner wall 110, connected together upstream by an air inlet lip 112. The air inlet 100 has an aerodynamic rounded profile that makes it possible to separate an upstream air flow F into the inner air flow F-INT guided by the inner wall 110 and an outer air flow F-EXT guided by the outer wall 111.

In reference to FIG. 1B, to reduce the braking distance of an aircraft, especially during landing, it is known to modify the orientation of the air flow in the bypass duct 600 so as to perform a thrust reversal phase B. In what follows, a thrust phase A (FIG. 1A) is distinguished wherein the bypass air flow F2 circulates from upstream to downstream in the bypass duct 600 and a thrust reversal phase B (FIG. 1B) wherein a reverse air flow F-INV circulates from downstream to upstream. It is specified that during a thrust reversal phase B, an inner air flow F-INT from the upstream air flow F circulates from upstream to downstream at the root of the fan 400 to supply the primary air flow F1 as well as in thrust phase A. The primary air flow F1 may also be supplied by a portion of the reverse air flow F-INV.

To carry out the thrust reversal phase, it is known by patent application FR2120172A1 to at least partially obstruct the bypass duct 600, downstream of the fan 400, and to jointly uncover the grids not shown housed in the nacelle 300 in order to form the reverse air flow F-INV oriented inversely to the bypass air flow F2. However, such a thrust reversal system has the disadvantage of penalizing the mass, size and drag of the aircraft propulsion unit 800.

In reference to FIG. 1B, it is known to provide a variable-pitch fan 400, known by its abbreviation "VPF", which comprises blades the pitch angle of which is controlled so as to reverse the direction of circulation of the air flow in the bypass duct 600. In practice, during a thrust reversal phase B, the reverse air flow F-INV circulates from downstream to upstream in the bypass duct 600 and then passes through the fan 400 and is guided upstream by the inner wall 110 of the air inlet 100. The reverse air flow F-INV then opposes the upstream air flow F, which allows braking.

In fact, it is observed that the reverse air flow F-INV remains attached to the air inlet 100 and forms a bonded reverse air flow F-INV$_C$ at the air inlet 100, i.e. it follows the contour of the air inlet 100 and joins the outer air flow F-EXT, instead of opposing the upstream air flow F. This results in an undesirable reduction in braking and consequently a reduction in the performance of the aircraft propulsion unit 800 in the thrust reversal phase B. In addition, the reverse air flow F-INV, after having joined the outer air flow F-EXT, is re-admitted into the bypass duct 600 through the downstream end of the nacelle 300, which generates an undesirable air flow loop that reduces the efficiency of the thrust reversal phase B.

To increase the performance of the aircraft propulsion unit 800 during a thrust reversal phase B, it is known by patent application FR1904092A1 to form inner ducts in the air inlet 100 that are open during the thrust reversal phase B to divert a portion of the reverse air flow F-INV and promote its separation. It is also known by patent application FR1904096A1 as an elastically deformable air inlet to modify its profile during a thrust reversal phase B. However, such solutions have the disadvantage of requiring an air inlet of complex and costly architecture.

It is also known by patent applications FR1904087A1, FR1904094A1 and FR1904089A1 an air inlet 100 comprising respectively deflecting members, rectifier blades and a mobile portion that are deployed during a thrust reversal phase B and retracted during a thrust phase A. However, such solutions have the disadvantage, in the retracted position, of having a substantial internal size in the annular cavity 113 of the air inlet 100. In addition, such solutions require the formation of housings in the inner wall 110 which disrupt the aerodynamics in the deployed position. It is also known by patent application FR3095241A1 an air inlet comprising a deflecting member.

The invention thus relates to an air inlet 100 of an aircraft propulsion unit 800 which promotes performance during a thrust reversal phase B, without reducing that during a thrust phase A, while having a simple, economical architecture and a limited size.

SUMMARY

The invention relates to a nacelle air inlet for an aircraft propulsion unit, said aircraft propulsion unit extending along a longitudinal axis oriented from upstream to downstream and comprising a turbine engine comprising a radially inner primary duct and a radially outer bypass duct configured to guide respectively from upstream to downstream a primary air flow and a bypass air flow during a thrust phase, said turbine engine comprising upstream a fan mounted rotatably about the longitudinal axis, said aircraft propulsion unit comprising thrust reversal means configured to modify the bypass air flow into a reverse air flow circulating from downstream to upstream in the bypass duct during a thrust reversal phase, said nacelle extending outwardly around the turbine engine and comprising at its upstream end the air inlet, said air inlet comprising an inner wall turned towards the longitudinal axis, an outer wall opposite the inner wall and an air inlet lip connecting upstream the inner wall and the air inlet lip.

The invention is remarkable in that:
the inner wall comprises a plurality of openings comprising an upstream end and a downstream end, and
the air inlet comprises a plurality of mobile members, a mobile member being mounted pivoting in each opening, each mobile member comprising a covering wall and a deflecting wall opposite the covering wall and being configured to pivot between:
 a covering position, wherein the covering wall is turned towards the longitudinal axis, obstructs the opening and extends in the extension of the inner wall so as to direct the bypass air flow to promote a thrust phase, and
 a deflecting position, where the deflecting wall is turned towards the longitudinal axis, obstructs the opening and is configured to separate the reverse air flow to promote a thrust reversal phase.

Thanks to the plurality of mobile members, the air inlet has a variable geometry. The performance in thrust reversal phase of the aircraft propulsion unit is advantageously improved, without reducing performance in the thrust phase. Indeed, the mobile members in the deflecting position advantageously allow the reverse air flow to be separated from the inner wall, so that it opposes the upstream air flow and generates an effective braking force. The reverse air flow thus separated does not remain attached to the nacelle, which avoids re-admitting it at its downstream end in the bypass duct and generating an unwanted air flow loop. While the deflecting position promotes thrust reversal, the covering position of the mobile members allows the aerodynamic profile of the air inlet to be reproduced in the thrust phase, by obstructing the openings in the continuity of the inner wall.

Advantageously, in the deflecting position, the mobile members further make it possible to obstruct the openings as well as in the covering position. No unwanted air flow circulates into the air inlet, which promotes aerodynamics, improves de-icing and reinforces the durability of the air inlet. The obstruction of openings in both positions is advantageously permitted by mobile members with two opposite walls, each wall allowing the opening to be obstructed in one position. Such an architecture is simple, economical and has a reduced size as the mobile member are mounted pivoting to move from one position to another.

According to a preferred aspect, at least two of the openings are separate. In other words, the mobile members are each mounted in a given opening separated from the others by a fixed wall. This promotes the robustness and durability of the air inlet.

According to another preferred aspect, at least two of the openings are adjacent so as to communicate with each other and form a global opening in which at least two mobile members are mounted. At least two of the mobile members are mounted adjacent so as to promote the deflecting of the reverse air flow. Preferably, the global opening is annular. This allows continuous circumferential deflecting of the reverse air flow.

Preferably, the openings are aligned transversely with respect to the longitudinal axis. In other words, a plane transverse to the longitudinal axis passes through all the openings. More precisely, a plane transverse to the longitudinal axis passes through all the upstream ends of the openings. Another plane transverse to the longitudinal axis passes through all the downstream ends of the openings. Preferably, the openings are equidistributed on the circumference of the inner wall. This allows a homogeneous deflecting of the reverse air flow.

According to one aspect of the invention, each mobile member comprises a separating end connecting the covering wall and the deflecting wall, said separating end being configured, in the deflecting position, to extend radially inwards with respect to the inner wall. In other words, the separating end does not extend into the extension of the inner wall but points towards the longitudinal axis. This allows the reverse air flow guided by the deflecting wall to be moved away from the inner wall, allowing the separation thereof.

Preferably, the separating end is curved inward to promote separation.

Preferably, the separating end is configured, in the deflecting position, to extend protruding upstream with respect to the opening. In other words, the separating end extends beyond the opening, upstream. This allows the reverse air flow to be gradually separated from the inner wall while maintaining the aerodynamics of the air inlet.

According to one aspect of the invention, the separating end has a pointed shape. Preferably, the separating end extends at an angle of less than 30°. This promotes separation and prevents reverse air flow from bypassing the separating end.

According to one aspect of the invention, the separating end is configured, in the covering position, to extend adjacent to the downstream end. Advantageously, in the covering position, the separating end ensures continuity between the inner wall and the covering wall and promotes aerodynamics. The separating end thus advantageously performs two different functions depending on whether it is in the covering or deflecting position.

According to one aspect of the invention, each mobile member comprises a blocking end that connects the covering wall and the deflecting wall, said blocking end being configured to cooperate with the upstream end in the covering position and with the downstream end in the deflection position. Advantageously, the blocking end limits easily and conveniently the movement of the mobile member between the covering position and the deflecting position.

According to one aspect of the invention, the blocking end is configured to move radially outwards to the inner wall between the covering position and the deflecting position. In other words, the air inlet comprising an annular cavity of longitudinal axis delimited by the inner wall, the outer wall and the air inlet lip, the blocking end extends into said annular cavity. This makes it possible to limit the pivoting of the mobile unit in a given direction to half a turn. This also makes it possible to protect the blocking end from the inner air flow and from the reverse air flow to prevent unwanted movement of the mobile member.

Preferably, the blocking end comprises a first groove formed on the side of the covering wall and configured to cooperate by complementarity of shapes with the upstream end. This keeps the mobile member in the covering position, with the separating end in the extension of the inner wall to promote aerodynamics.

Preferably, the blocking end comprises a second groove formed on the side of the deflecting wall and configured to cooperate by complementarity of shapes with the downstream end of the opening. This allows holding the mobile member in the separating position and preventing the separating end from bearing against the upstream end, to promote its durability.

According to one aspect of the invention, each mobile member is mounted movable around a pivot of a pivot axis tangent to the inner wall and belonging to a plane transverse to the longitudinal axis. This makes it possible to use the force of the inner air flow and of the reverse air flow to facilitate the movement of the mobile member between the covering position and the deflecting position.

According to one aspect of the invention, the mobile member extends on either side of the pivot. This allows switching from one position to the other by simply reversing the mobile member in the opening.

Preferably, the pivot is mounted closer to the upstream end than to the downstream end of the opening. Preferably, the pivot is equidistant from the separating end and the blocking end. This allows the separating end to extend protruding from the opening and thus promotes separation. Such characteristics make it possible to promote a passive switchover during operation of the turbine engine.

The invention also relates to a nacelle for an aircraft propulsion unit, said aircraft propulsion unit extending along a longitudinal axis oriented from upstream to downstream and comprising a turbine engine comprising a radially inner primary duct and a radially outer bypass duct configured to guide respectively a primary air flow and a bypass air flow during a thrust phase from upstream to downstream, said turbine engine comprising upstream a fan rotatably mounted about the longitudinal axis, said aircraft propulsion unit comprising thrust reversal means configured to modify the bypass air flow into a reverse air flow circulating from downstream to upstream in the bypass duct during a thrust reversal phase, said nacelle extending outwardly around the turbine engine and comprising at its upstream end an air inlet as described previously.

The invention also relates to a nacelle for an aircraft propulsion unit, said aircraft propulsion unit extending along a longitudinal axis oriented from upstream to downstream and comprising a turbine engine comprising a radially inner primary duct and a radially outer bypass duct configured to guide respectively a primary air flow and a bypass air flow during a thrust phase from upstream to downstream, said turbine engine comprising upstream a fan rotatably mounted about the longitudinal axis, said aircraft propulsion unit comprising thrust reversal means configured to modify the bypass air flow into a reverse air flow circulating from downstream to upstream in the bypass duct during a thrust reversal phase, said nacelle extending outwardly around the turbine engine and comprising at its upstream end an air inlet as described previously.

Preferably, the fan comprises variable-pitch blades so as to form the thrust reversal means. Such thrust reversal means are efficient and have a limited size and weight. Such thrust reversal means are suitable for a turbine engine with a large diameter and a high dilution rate.

The invention further relates to a method for using an air inlet of an aircraft propulsion unit such as described previously, wherein each mobile member is initially in the covering position in order to guide the bypass air flow in order to promote a thrust phase, said method comprising, during a thrust reversal phase, a movement of each mobile member in the deflecting position so as to separate the reverse air flow.

Such a method is advantageously simple and quick to implement, simply by pivoting the mobile member and is repeatable. Preferably, the movement is implemented by at least one active controllable member. Preferably, the movement is implemented synchronously for each mobile member.

The invention also relates to a method for using an air inlet of an aircraft propulsion unit such as described previously, wherein each mobile member is initially in the deflecting position so as to separate the reverse air flow in order to promote a thrust reversal phase, said method comprising, during a thrust phase, a movement of each mobile member in the covering position so as to guide the bypass air flow.

Preferably, the movement of each mobile member is implemented passively, by the action of the inner air flow on the separating end.

The invention further relates to a method for using an aircraft propulsion unit as described previously, said turbine engine being initially in the thrust phase wherein a bypass air flow circulates from upstream to downstream, each mobile member of the air inlet being initially in the covering position in order to guide the bypass air flow, a method wherein, during a thrust reversal phase of the turbine engine, the thrust reversal means are configured to modify the bypass air flow into a reverse air flow circulating from downstream to upstream and each mobile member is moved to the deflecting position to separate the reverse air flow.

The invention further relates to a method of using an aircraft propulsion unit as described previously, said turbine engine being initially in the thrust reversal phase wherein an air flow circulates from downstream to upstream, each mobile member of the air inlet being initially in the deflecting position so as to separate the reverse air flow, method wherein, during a thrust phase of the turbine engine, the thrust reversal means are configured to modify the reverse air flow into a bypass air flow circulating from upstream to downstream and each mobile member is moved to the covering position in order to guide the bypass air flow.

DESCRIPTION OF THE DRAWINGS

The invention will be better understood upon reading the following description, given as an example, and by referring to the following figures, given as non-limiting examples, wherein identical references are given to similar objects.

It should be noted that the figures set out the invention in detail in order to implement the invention, said figures may of course be used to better define the invention where applicable.

DETAILED DESCRIPTION

Aircraft Propulsion Unit

Figure 2A:
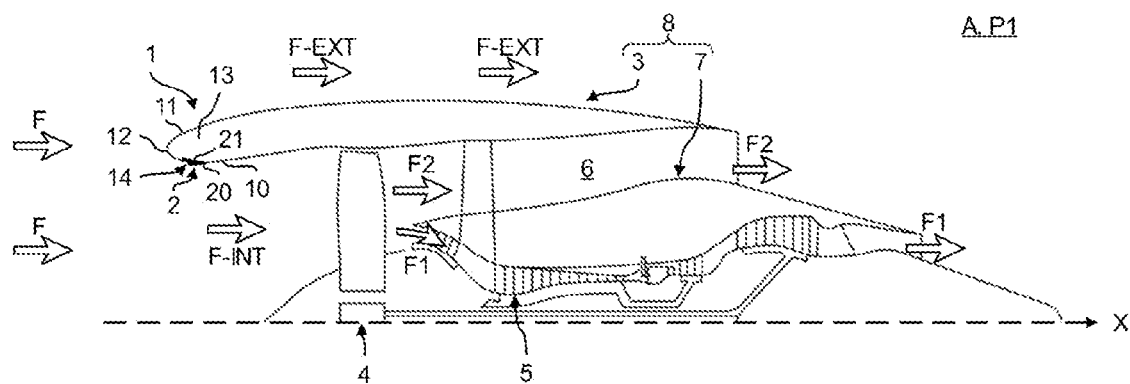
FIG. 2A and FIG. 2B are schematic representations in longitudinal half-section of an aircraft propulsion unit according to one embodiment of the invention respectively during a thrust phase and during a thrust reversal phase.

As shown in FIG. 2A and described previously, the aircraft propulsion unit 8 extends along a longitudinal axis X oriented from upstream to downstream and comprises a turbine engine 7 and a nacelle 3. The turbine engine 7 extends along the longitudinal axis X and is configured to allow propulsion of the aircraft from the acceleration of an inner air flow F-INT circulating from upstream to downstream in the turbine engine 7. The nacelle 3 extends outwardly around the turbine engine 7 along the longitudinal axis X and makes it possible to guide the inner air flow F-INT in the turbine engine 7. Subsequently, the terms "upstream" and "downstream" are defined with respect to the orientation of the longitudinal axis X. The terms "inner" and "outer" in turn are defined along the radial direction with respect to the longitudinal axis X.

Still as shown in FIG. 2A and as described previously, the turbine engine 7 is of the bypass type and comprises upstream a fan 4 rotatably mounted about the longitudinal axis X to accelerate the inner air flow F-INT from upstream to downstream. The turbine engine 7 also comprises, downstream of the fan 4, a radially inner primary duct 5 and a radially outer bypass duct 6, which are configured to guide respectively a first portion of the inner air flow F-INT, known as the primary air flow F1, for fuel combustion, and a second portion of the inner air flow F-INT, known as the bypass air flow F2, in order to generate the thrust of the turbine engine 7.

Still in reference to FIG. 2A and as described previously, the nacelle 3 extends radially outwards to the fan 4 and radially outwardly delimits the bypass duct 6. At its upstream end, the nacelle 3 comprises an air inlet 1 delimiting an annular cavity 13 of longitudinal axis X. The air inlet 1 comprises an inner wall 10 turned towards the longitudinal axis X and an outer wall 11 opposite the inner wall 10, connected together upstream by an air inlet lip 12 comprising a leading edge. The air inlet 1 makes it possible to separate an upstream air flow F into the inner air flow F-INT guided by the inner wall 10 and an outer air flow F-EXT guided by the outer wall 11.

Thrust Phase A and Thrust Reversal Phase B

Figure 2B:
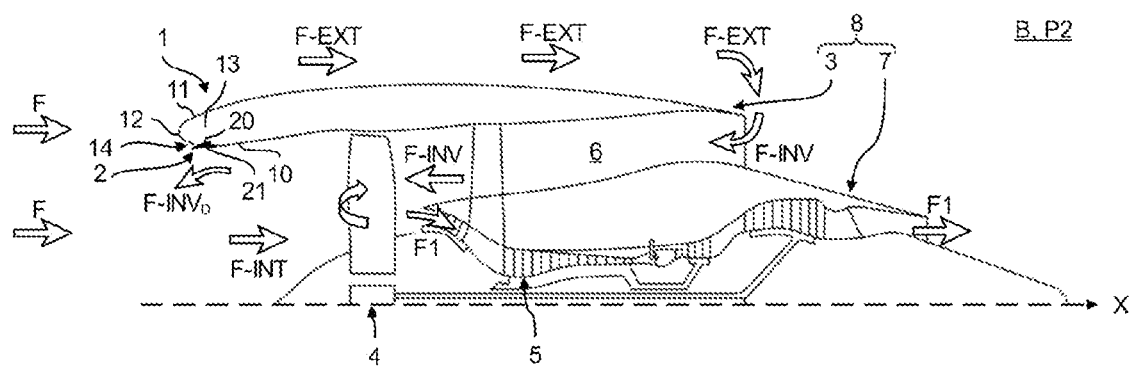

As shown in FIG. 2B and described previously, to reduce the braking distance of an aircraft, especially during landing, the aircraft propulsion unit 8 further comprises thrust reversal means in order to modify the orientation of the air flow in the bypass duct 6. In what follows, a thrust phase A (FIG. 2A) is distinguished wherein the bypass air flow F2 circulates from upstream to downstream in the bypass duct 6 and a thrust reversal phase B (FIG. 2B) wherein a reverse air flow F-INV circulates from downstream to upstream. It is specified that during a thrust reversal phase B, an inner air flow of F-INT from the upstream air flow F circulates from upstream to downstream at the root of the fan 4 to supply the primary air flow F1 as well as in thrust phase A. The primary air flow F1 may also be supplied by a portion of the reverse air flow F-INV.

In the example in FIG. 2B, the thrust reversal means are formed by the fan 4, which is of the variable-pitch type, abbreviated as "VPF". Such a variable-pitch fan 4 comprises blades the pitch angle of which is controlled (see FIG. 2B) so as to reverse the direction of air flow in the bypass duct 6. In practice, during a thrust reversal phase B, the reverse air flow F-INV circulates from downstream to upstream in the bypass duct 6 and then passes through the fan 4 and is guided upstream by the inner wall 10 of the air inlet 1. The reverse air flow F-INV then opposes the upstream air flow F, which allows braking.

It goes without saying that the thrust reversal means could be in a form other than that described in this example. For example, it is known by patent application FR2120172A1 to at least partially obstruct the bypass duct 6, downstream of the fan 4, and to jointly uncover the grids not shown housed in the nacelle 3 in order to form the reverse air flow F-INV oriented inversely to the bypass air flow F2. However, such a thrust reversal system has a larger mass and size than the variable-pitch fan 4.

Air Inlet with Variable Geometry

In reference to FIGS. 2A and 2B, according to the invention, the air inlet 1 is of the variable geometry type, i.e. it comprises a profile adapted for a thrust phase A and another profile adapted for a thrust reversal phase B. More precisely, according to the invention, the air inlet 1 comprises openings 14 formed in the inner wall 10 and mobile members 2. A mobile member 2 is mounted pivoting in each opening 14. Each mobile member 2 comprises a covering wall 20 and a deflecting wall 21 opposite the covering wall 20 and is configured to pivot between:

a covering position P1 (FIG. 2A), wherein the covering wall 20 is turned towards the longitudinal axis X, obstructs the opening 14 and extends in the extension of the inner wall 10 of the air inlet 1 so as to guide the bypass air flow F2 in order to promote a thrust phase A, and a deflecting position P2 (FIG. 2B), wherein the deflecting wall 21 is turned towards the longitudinal axis X, obstructs the opening 14 and is configured to separate the reverse air flow F-INV in order to promote a thrust reversal phase B.

Figure 1A:
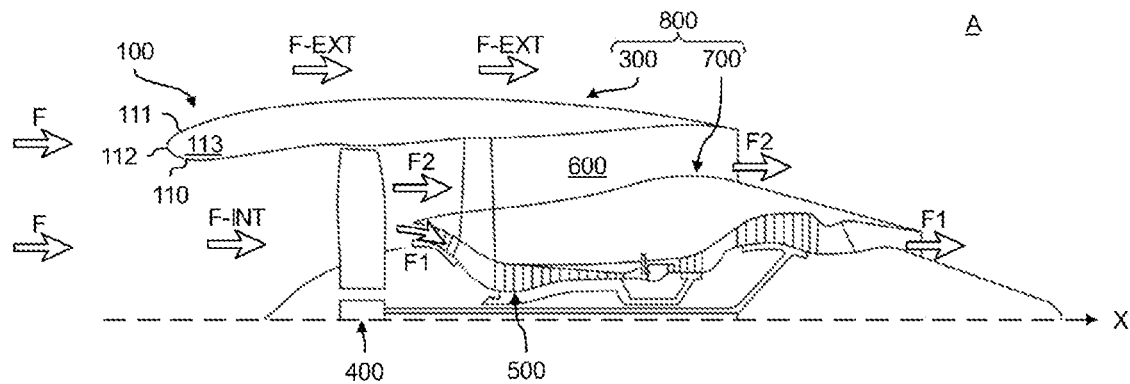
FIG. 1A and FIG. 1B are schematic representations in longitudinal half-section of an aircraft propulsion unit according to the prior art respectively during a thrust phase and during a thrust reversal phase.
Figure 1B:
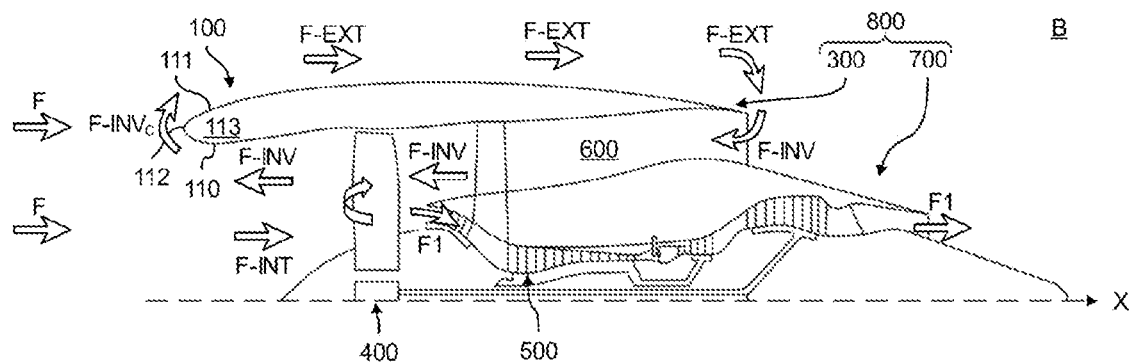

As shown in FIG. 2B, the mobile members 2 in the deflecting position P2 advantageously make it possible to form a deflected reverse air flow F-INV$_D$ at the air inlet 1, which is separated from the inner wall 10 contrary to the prior art. Such a deflected reverse air flow F-INV$_D$ opposes the upstream air flow F, which improves the thrust reversal B, unlike the undesirable bonded reverse air flow F-INV$_C$ of the prior art (see FIG. 1B).

Openings

Figure 3A:
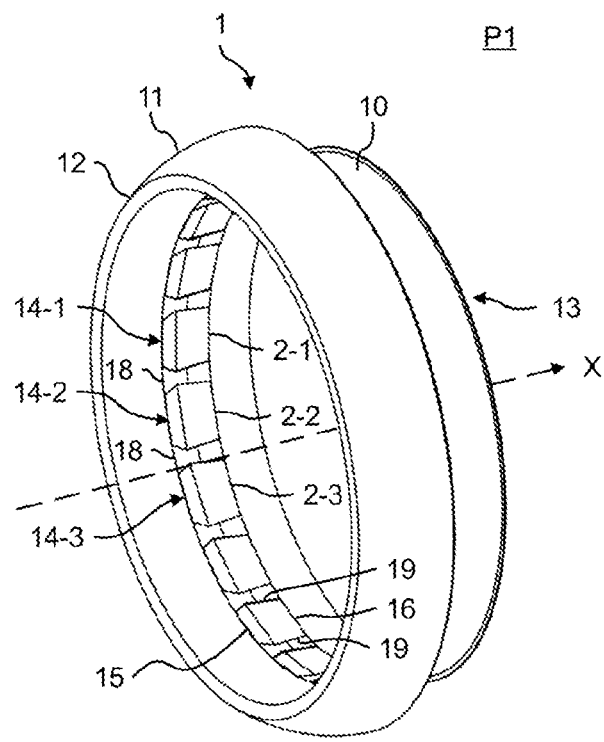
FIG. 3A and FIG. 3B are schematic representations in perspective of the air inlet of the aircraft propulsion unit of FIG. 2A and FIG. 2B respectively during a thrust phase and during a thrust reversal phase.
Figure 3B:
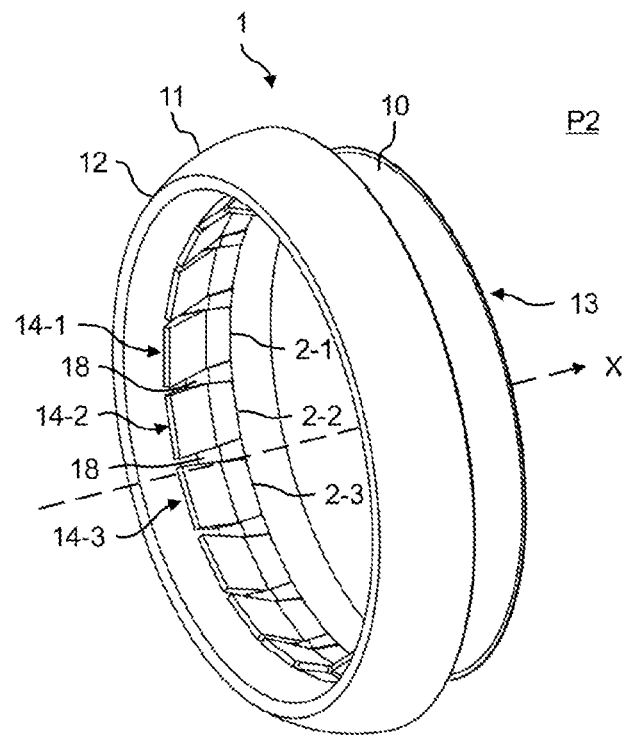

In the example of FIGS. 3A and 3B, the air inlet 1 comprises twenty openings 14-1, 14-2, 14-3. The openings 14-1, 14-2, 14-3 are aligned transversely to the longitudinal axis X. Thus, a same transverse plane passes through each opening 14-1, 14-2, 14-3. The openings 14-1, 14-2, 14-3 are further spaced from each other, and in this example equidistributed around the circumference of the inner wall 10.

Thus, the inner wall 10 comprises fixed blades 18 each extending between two consecutive openings 14. The fixed blades 18 extend longitudinally with respect to the longitudinal axis X and connect the inner wall 10 extending respectively upstream and downstream of the openings 14.

Still in the example of FIGS. 3A and 3B, a single mobile member 2 is mounted in each of the openings 14, so that the air inlet 1 comprises the same number of mobile members 2 as openings 14. Similarly to the openings 14, the mobile members 2 are mounted aligned in a plane transverse to the longitudinal axis X, are spaced from each other and, in this example, equidistributed along the circumference of the inner wall 10. Such an air inlet 1 advantageously allows global and homogeneous separating of the reverse air flow F-INV during a thrust reversal phase B. The mobile members 2 are furthermore easily pivotable without contact or mutual interference.

It is specified that the number of openings 14, equal to twenty in this example, is any in the framework of the invention. Preferably, the number of openings 14 is greater than ten for sufficient separating and less than forty to limit complexity. Moreover, it goes without saying that the openings 14 can be positioned differently on the inner wall 10. As examples, the openings 14 could be arranged in a staggered pattern instead of being aligned. The openings 14 could also be closer to each other on an angled portion of the inner wall 10 to locally reinforce the separating. The openings 14 could in particular be adjacent, namely communicating with each other and forming together a global opening, over all or an angular portion of the inner wall 10 for a continuous separating. It should be noted that no fixed blade 18 extends between adjacent openings 14 and that the associated mobile members 2 are mounted adjacent in the same global opening.

Preferably, as shown in FIGS. 3A and 3B, the openings 14 are identical to each other, i.e. of the same shape and size. This makes it possible to use identical mobile members 2 with standardized shape and size, allowing large-scale production. The size of the openings 14 is determined by the diameter of the inner wall 10 of the air inlet 1 and the number of openings 14. With regard to their shape, each opening 14 comprises an upstream end 15 and a downstream end 16 (see FIG. 3A) so as to cooperate with the mobile member 2, as will be seen later. In the example of FIGS. 3A and 3B, the upstream end 15 and the downstream end 16 each extend in a plane transverse to the longitudinal axis X. The upstream end 15 and the downstream end 16 are connected by curved side ends 19 (see FIG. 3A) so that the opening 14 comprises a variable circumferential width along the longitudinal axis X, minimal at the upstream end 15 and at the downstream end 16 and maximal between the latter. Such a shape makes it possible to promote cooperation with the mobile member 2 as well as obstruction of the opening 14 by the mobile member 2, as will be seen later. It goes without saying that the openings 14 may comprise a different shape, such as a constant circumferential width along the longitudinal axis X.

Mobile Members

A mobile member 2 is described in what follows, then its cooperation with opening 14, this description being valid for each mobile member 2.

Figure 4:
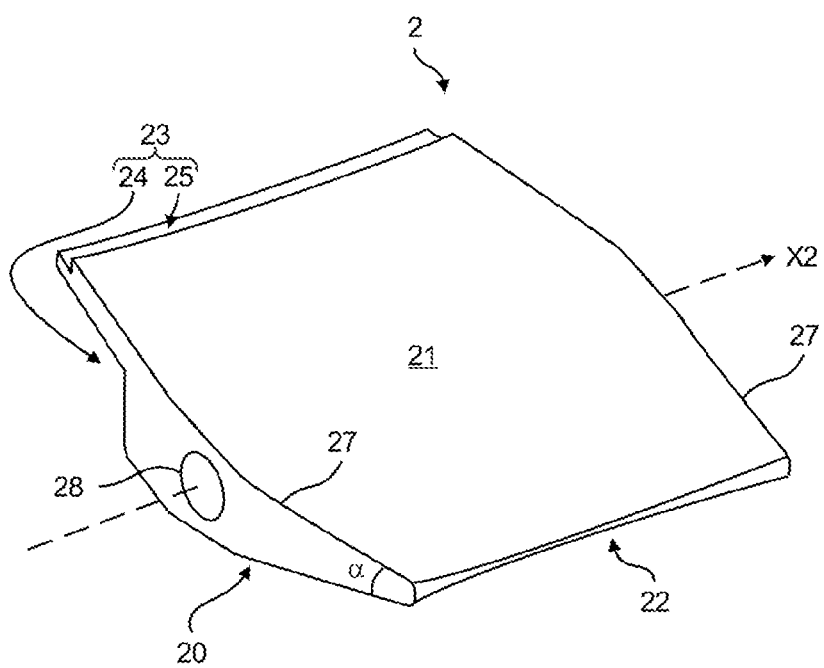
FIG. 4 is a schematic perspective representation of a mobile member of the air inlet of FIG. 3A and FIG. 3B.

In reference to FIG. 4, the mobile member 2 comprises a through-opening 28 extending along a pivot axis X2, so as to be able to be mounted pivotally around a pivot extending along said pivot axis X2. The mobile member 2 also comprises a covering wall 20 and a deflecting wall 21, opposite the covering wall 20, which extend on either side of the through-opening 28 longitudinally in relation to the pivot axis X2. The covering wall 20 comprises a convex shape that reproduces the profile of the inner wall 10 of the air inlet 1. The deflecting wall 21 comprises a concave shape to deflect the reverse air flow F-INV.

As shown in FIG. 4, the mobile member 2 also comprises a separating end 22 and a blocking end 23 connecting on either side the covering wall 20 and the deflecting wall 21 and extending longitudinally with respect to the pivot axis X2. In addition, the mobile member 2 comprises side walls 27 extending transversely with respect to the longitudinal axis X and passed through by the through-opening 28. The side walls 27 connect the covering wall 20, the deflecting wall 21, the separating end 22 and the blocking end 23.

In reference to FIG. 4, the deflecting end 22 has a pointed shape, preferably at an angle α of less than 30°, so as to effectively separate the reverse air flow F-INV. The blocking end 23 is configured to cooperate with the upstream end 15 and the downstream end 16 of the opening 14. In this example, the blocking end 23 comprises a first groove 24, formed on the side of the covering wall 20 and configured to cooperate in shape complementarity with the upstream end 15 of the opening 14, as well as a second groove 25, formed on the side of the deflecting wall 21 and configured to cooperate in shape complementarity with the downstream end 16 of the opening 14. It goes without saying that the blocking end 23 could cooperate differently with the upstream end 15 and/or the downstream end 16 of the opening 14. Still in this example, the side walls 27 preferably comprise a shape identical to the side ends 19 of the opening 14. This allows the mobile member 2 to obstruct the opening 14 in the covering position P1 as in the deflecting position P2.

As shown in FIG. 4, the mobile member 2 extends on either side of the through-opening 28. Preferably, the through-opening 28 is substantially central, i.e. it is as close to the deflecting end 22 as to the blocking end 23. The term "substantially" here means that a deviation of 10% is tolerated. This advantageously allows a passive switchover as will be presented later.

Preferably, the mobile member 2 is monoblock, i.e. made of the same material, to ensure its robustness and durability. Preferably, the mobile member 2 comprises a composite material with good mechanical strength. Still preferably, the mobile member 2 is obtained by machining or by 3D printing.

Covering Position P1 and Deflecting Position P2

Figure 5A:
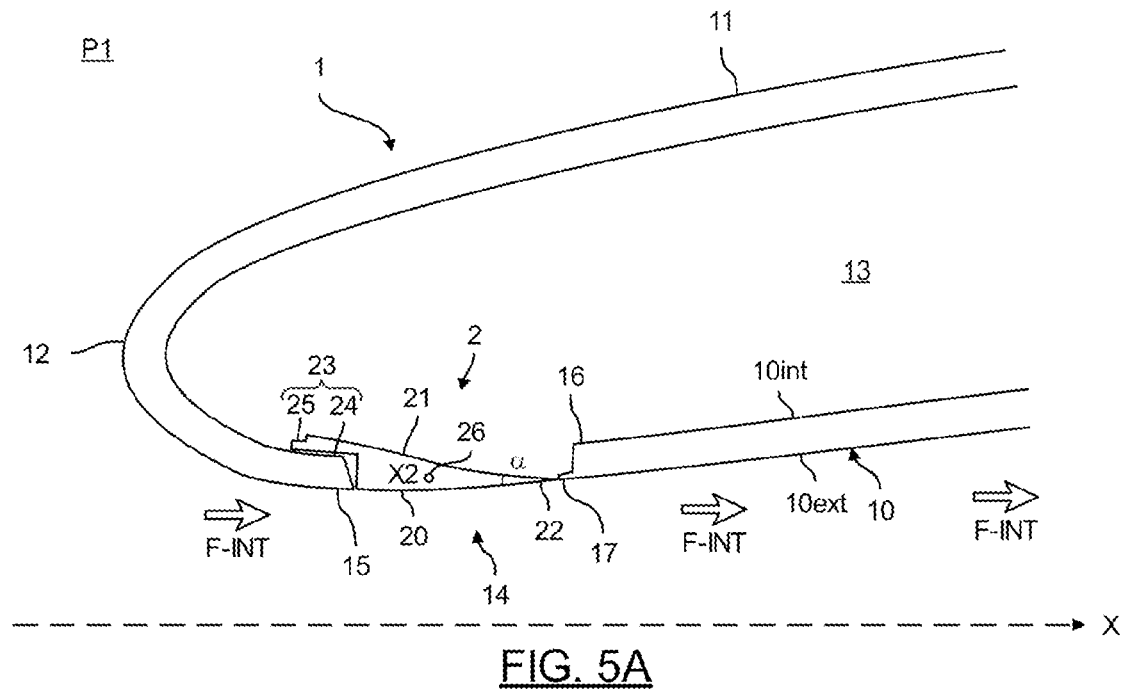
FIG. 5A and FIG. 5B are schematic representations in longitudinal half-section of the air inlet of FIG. 3A and FIG. 3B with a mobile member respectively in the covering position and in the deflecting position.
Figure 5B:
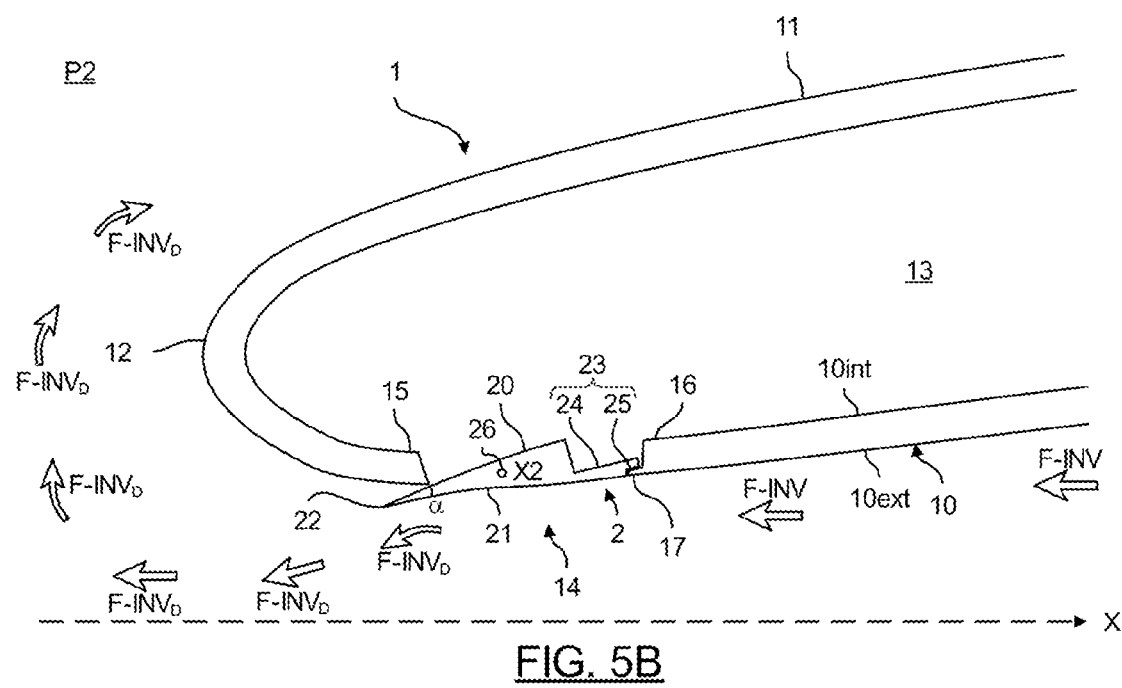
Figure 6A:
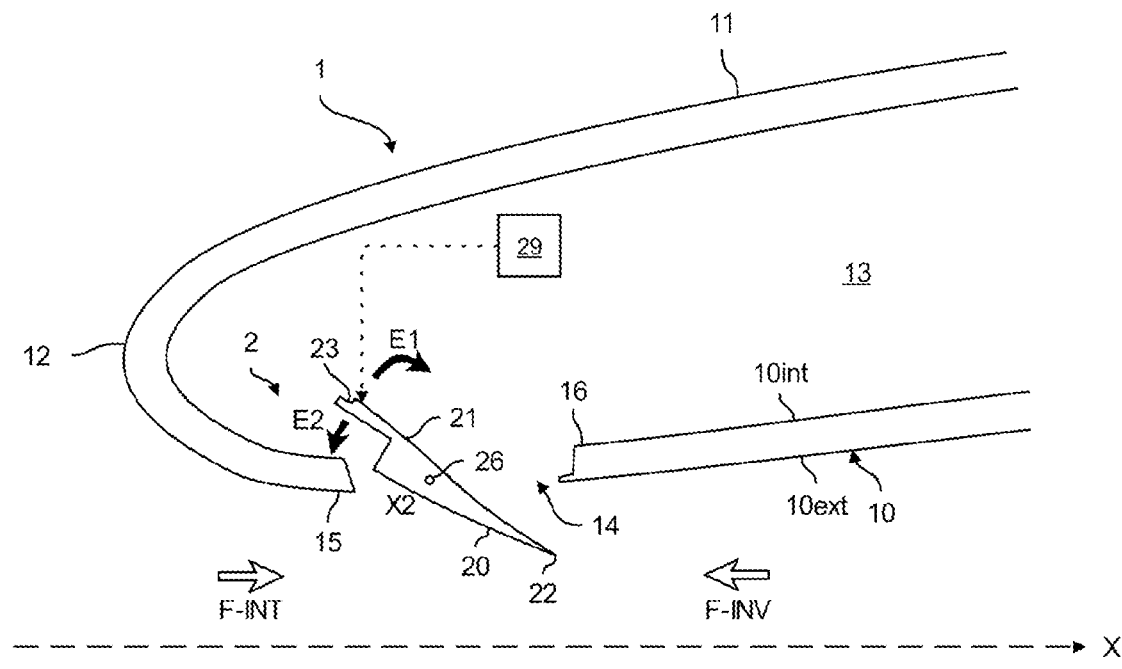
FIG. 6A, FIG. 6B and FIG. 6C are schematic representations of the movement of a mobile member between the covering position and the deflecting position according to one embodiment of the method for using the air inlet of FIG. 3A and FIG. 3B of the invention.
Figure 6B:
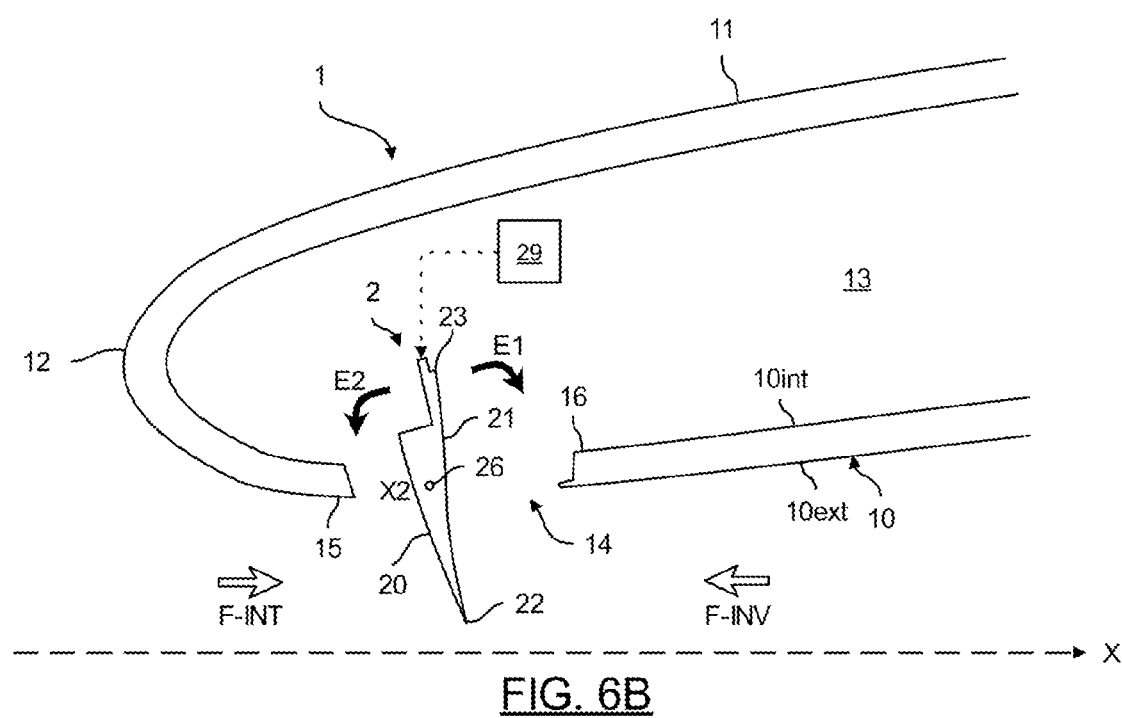
Figure 6C:
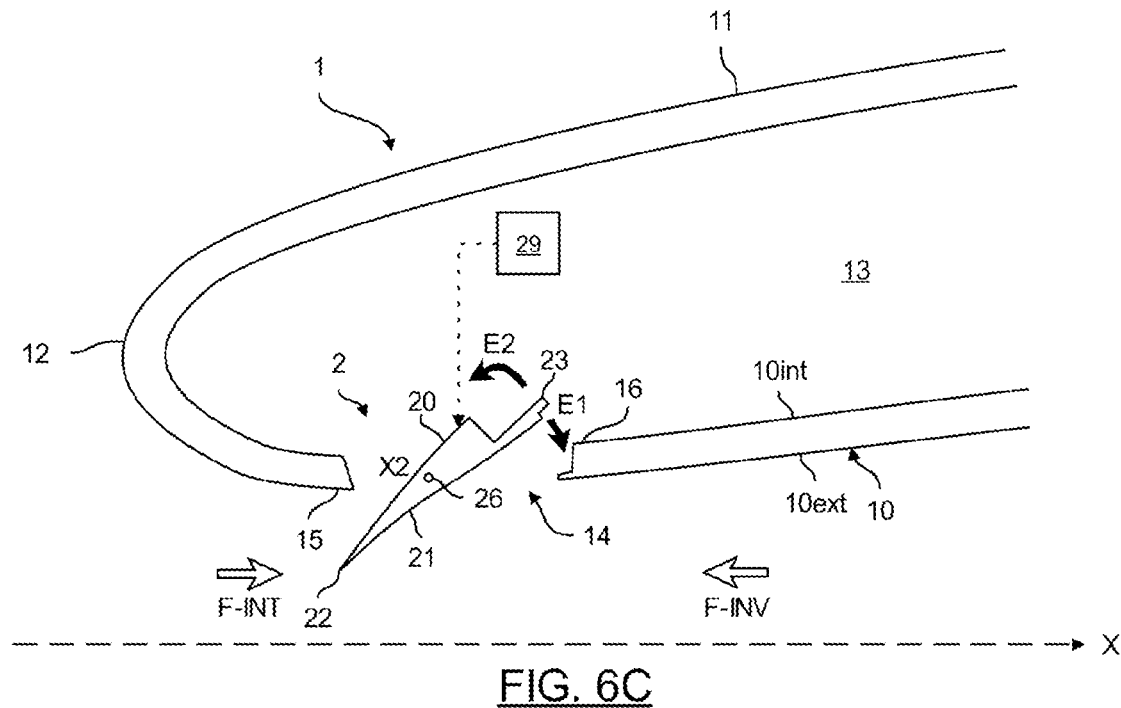

In reference to FIG. 5A and FIG. 5B, the mobile member 2 is mounted mobile in the opening 14 around a pivot 26 tangential to the inner wall 10 and belonging to a plane transverse to the longitudinal axis X. This advantageously makes it possible to use the force of the inner air flow F-INT and the reverse air flow F-INV, circulating longitudinally, to facilitate the movement of the mobile member 2. In this example, the pivot 26 is off-centered upstream in the opening 14 to promote a switchover during the thrust reversal phase B as will be seen later. According to one aspect, as shown in FIG. 6A to 6C, the pivot 26 is connected to an active control member 29, such as an actuator, to move the mobile member 2, whether or not complementary to the force of the air flow. Thus, the position of the mobile member 2 can be conveniently controlled to achieve a separating.

As shown in FIGS. 5A and 5B, the blocking end 23 of the mobile member 2 is further away from the pivot 26 than the upstream 15 and downstream 16 ends of the opening 14 in order to limit the rotation of the mobile member 2 between the covering position P1 and the deflecting position P2. This makes it possible to hold the blocking end 23 inside the annular cavity 13 and the deflecting end 22 outside the annular cavity 13 in the inner air flow F-INT. In other words, the rotation of the mobile member 2 is limited to half a turn by the contact of the blocking end 23 on the inner wall 10.

Preferably, the pivot 26 is common to several mobile members 2, and preferably comprises an annular shape of longitudinal axis X to be common to all the mobile members 2, in order to move them simultaneously. Such a pivot 26 makes it possible to facilitate the grouped control of a plurality of mobile members 2.

Figure 5C:
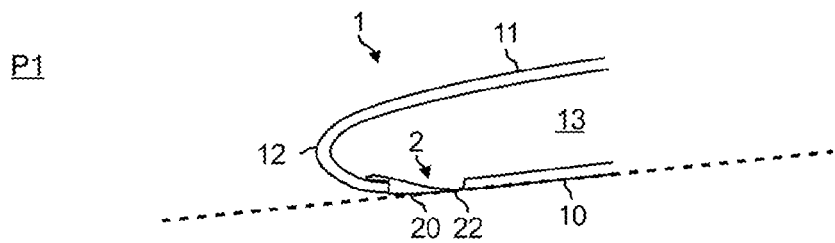
FIG. 5C and FIG. 5D are schematic cross-sectional representations of the air inlet of FIG. 3A and FIG. 3B respectively in the covering position and in the deflecting position.
Figure 5C:
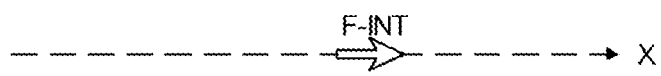
Figure 5C:
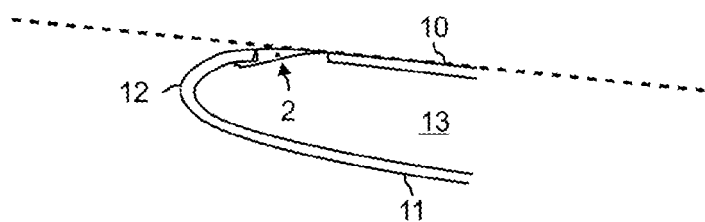

As shown in FIG. 5A, in the covering position P1, the covering wall 20 is turned towards the longitudinal axis X and obstructs the opening 14 in the extension of the inner wall 10, in order to preserve the aerodynamics of the air inlet 1 in the thrust phase A. The blocking end 23 extends in radial bearing inwards on an inner face 10int of the inner wall 10. More precisely, the first groove 24 of the blocking end 23 cooperates by complementarity of shapes with the upstream end 15 of the opening 14. This allows the mobile member 2 to be held in the covering position P1. The deflecting end 22 extends along an outer face 10ext of the inner wall 10. The deflecting end 22 more precisely ensures continuity between the covering wall 20 and the downstream end 16 of the opening 14. As shown in FIG. 5C, in the covering position P1, the air inlet 1 has a divergent inner section for the inner air flow F-INT circulating from upstream to downstream as well as a smooth profile avoiding separation of the flow lines.

Figure 5D:
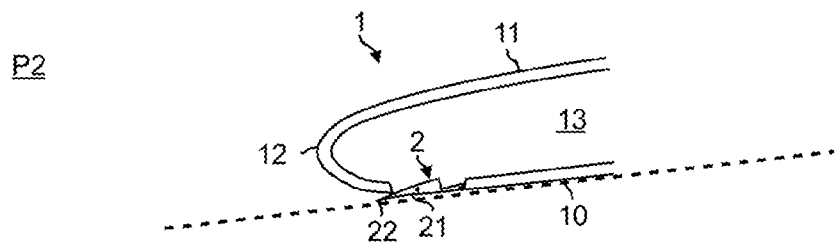
Figure 5D:
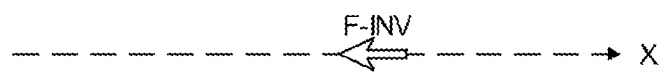
Figure 5D:
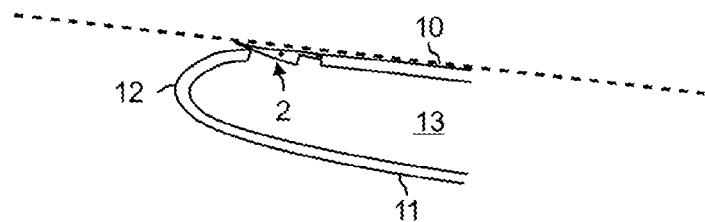

As shown in FIG. 5B, in the deflecting position P2, the deflecting wall 21 is turned towards the longitudinal axis X and the separating end 22 extends protruding upstream and inward with respect to the opening 14, thanks to the off-centered assembly of the pivot 26. The concave shape of the deflecting wall 21 and the pointed shape of the separating end 22 effectively separate the reverse air flow F-INV from the inner wall 10, while preserving the aerodynamics. In addition, the deflecting wall 21 obstructs the opening 14 in the deflecting position P2, which prevents the circulation of air in the air inlet 1. This helps to ensure aerodynamics and does not disrupt de-icing. The locking end 23, on the other hand, extends in radial bearing inwards on an inner face 10int of the inner wall 10. More precisely, the second groove 25 of the blocking end 23 cooperates by complementarity of shapes with the upstream end 16 of the opening 14, and more precisely with an edge 17 of the upstream end 16 which extends protruding upstream. The blocking end 23 advantageously ensures alone that the deflecting position P2 is held so that the separating end 22 does not bear on the inner wall 10. This promotes its durability. As shown in FIG. 5D, in deflecting position P2, the air inlet 1 has a convergent inner section for the reverse air flow F-INV, advantageously forming a nozzle convergent.

The separating end 22, which is thin, is not solicited to hold the mobile member 2 in position. The blocking end 23, thicker, makes it possible to hold the mobile member 2 in position.

To summarize, the variable geometry air inlet 1 of the invention comprises mobile members 2 mounted pivoting in openings 14 so that, either the covering wall 20 (covering position P1) or the deflecting wall 21 (deflection position P2), obstructs the opening 14. The performance in thrust reversal phase B is advantageously improved, as the reverse air flow F-INV$_D$, instead of hugging the contour of the air inlet 1, is deflected to oppose the entire upstream air flow F, which promotes braking. In addition, this avoids forming an unwanted bonded reverse air flow loop F-INV$_C$ as in the prior art (see FIG. 1B). The aerodynamics are preserves in thrust phase A.

Method for Using

In reference to FIGS. 6A, 6B, and 6C, a method for using the air inlet 1 previously described is described below. The turbine engine 7 is initially considered in thrust phase A and the mobile members 2 in the covering position P1 (see FIG. 2A). During a thrust reversal phase B, the pitch angle of the blades of the fan 4 is modified, which generates a reverse air flow F-INV in the bypass duct 6 (see FIG. 2B). As shown successively in FIG. 6A to FIG. 6C, the active control member 29 moves during a movement E1 each mobile member 2 to the deflecting position P2 by a simple pivoting of a half turn. The movement is advantageously promoted by the force exerted by the reverse air flow F-INV flowing from downstream to upstream on the separating end 22 extending internally. The blocking end 23, on the other hand, extends outwards, into the annular cavity 13 of the air inlet 1, protected from the reverse air flow F-INV.

Subsequently, during a new thrust phase A, the pitch angle of the blades of the fan 4 is modified again, which generates an inner air flow F-INT in the bypass duct 6 (see FIG. 2A) and stops the reverse air flow F-INV. As shown successively in FIG. 6C to FIG. 6A, the active control member 29 moves during a movement E2 each mobile member 2 into the covering position P1 by a simple reverse pivoting of a half-turn. The movement is advantageously promoted by the force exerted by the inner air flow F-INT circulating from upstream to downstream on the separating end 22 extending internally. The blocking end 23, on the other hand, extends outwards, into the annular cavity 13 of the air inlet 1, protected from the inner air flow F-INT.

The movements E1, E2 of the mobile members 2 between the covering position P1 and the deflecting position P2 are advantageously fast, easy and reproducible as desired.

Figure 7A:
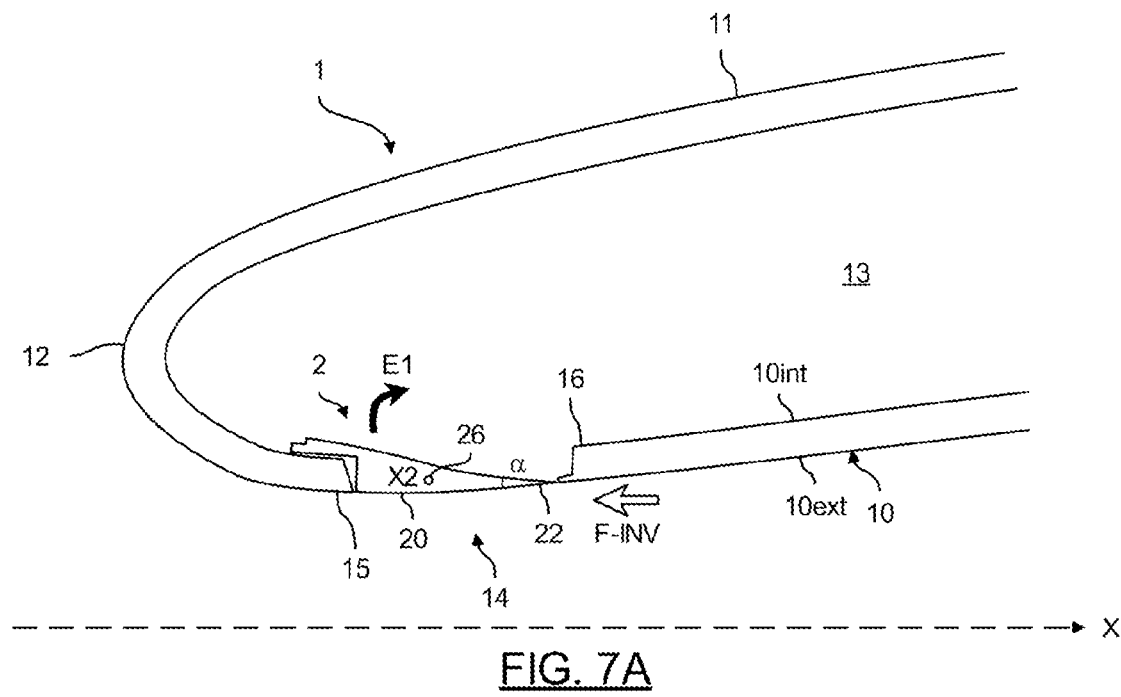
FIG. 7A and FIG. 7B are schematic representations of the movement of a mobile member between the covering position and the deflecting position according to another embodiment of the method for using the air inlet of FIG. 3A and FIG. 3B.
Figure 7B:
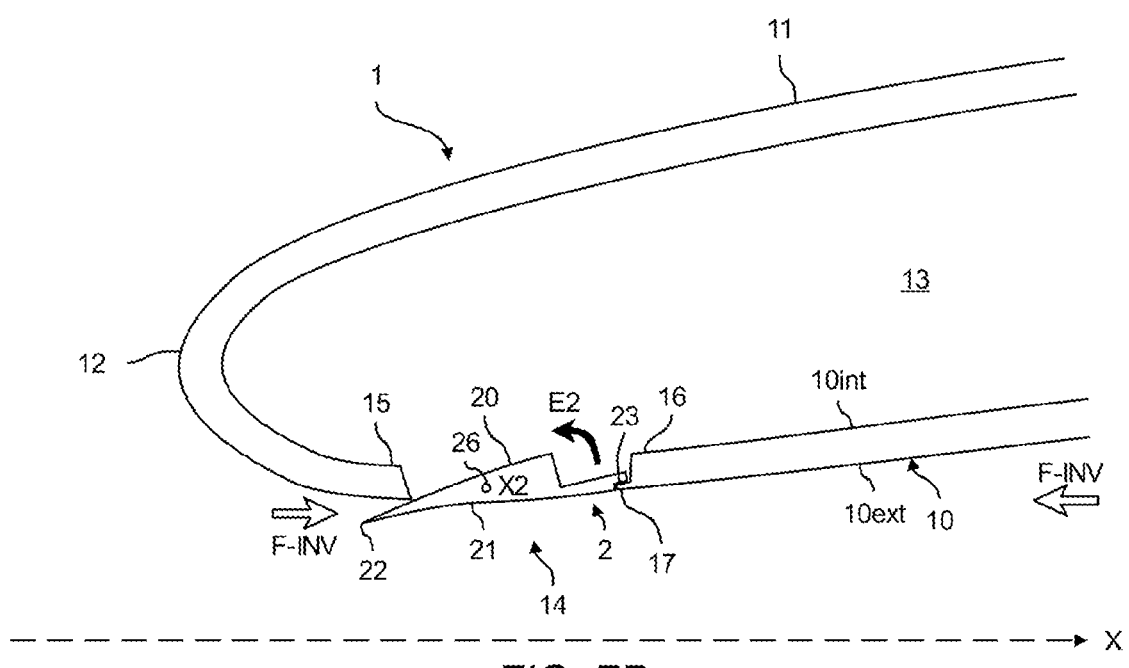

In the example of FIGS. 6A, 6B, and 6C, the movement E1 or E2 is controlled by the active control member 29. Alternatively, as shown in FIGS. 7A and 7B, at least a portion of the motion E1 or E2 could be passively implemented by the inner air flow F-INT and the reverse air flow F-INV. In the example of FIGS. 7A and 7B, the movements E1, E2 are entirely passively implemented.

To do this, as shown in FIG. 7A, in the covering position P1, a reduced space is formed between the downstream end 16 of the opening 14 and the separating end 22 of the mobile member 2 so that the reverse air flow F-INV can engulf there and create a lever effect to initiate the movement E1 of the mobile member 2 to the deflecting position P2. Once the movement E1 is initiated, the action of the reverse air flow F-INV on the deflecting wall 21 makes it possible to obtain the deflecting position P2. Preferably, the separating end 22 extends radially inwards with respect to the downstream end 16, so as to facilitate the passage of air between the separating end 22 and the downstream end 16 and the initiation of the movement E1.

In reference to FIG. 7B, the movement E2 from the deflecting position E2 to the covering position E1 is ensured by the action of the inner air flow F-INT on the separating end 22 at the upstream end 15 of the opening 14 as well as on the covering wall 20. Advantageously, in the deflecting position P2, the separating end 22 protrudes inwards and upstream, which allows the inner air flow F-INT to exert a lever effect and initiate the movement E2.

The invention claimed is:

1. An air inlet of a nacelle of an aircraft propulsion unit, said aircraft propulsion unit extending along a longitudinal axis oriented from upstream to downstream and comprising a turbine engine comprising a radially inner primary duct and a radially outer bypass duct configured to guide from upstream to downstream respectively a primary air flow and a bypass air flow during a thrust phase, said turbine engine comprising upstream a fan rotatably mounted about the longitudinal axis, said aircraft propulsion unit comprising thrust inversion means configured to modify the bypass air flow into a reverse air flow circulating from downstream to upstream in the bypass duct during a thrust reversal phase, said nacelle extending outwardly around the turbine engine and comprising at its upstream end the air inlet, said air inlet comprising an inner wall turned towards the longitudinal axis, an outer wall opposite the inner wall and an air inlet lip connecting upstream the inner wall and the outer wall, wherein:

the inner wall defines a plurality of openings comprising an upstream end and a downstream end, and the air inlet comprises a plurality of mobile members, a mobile member of the plurality of mobile members being mounted pivoting in each opening of the plurality of openings, each of the mobile members comprising a covering wall and a deflecting wall opposite the covering wall and being configured to pivot between:

a covering position, wherein the covering wall is turned towards the longitudinal axis, obstructs the opening and extends along the inner wall so as to guide the bypass air flow in order to promote the thrust phase, and a deflecting position, wherein the deflecting wall is turned towards the longitudinal axis, obstructs the opening and is configured to separate the reverse air flow in order to promote the thrust reversal phase.

2. The air inlet according to claim 1, wherein each of the mobile members comprises a separating end connecting the covering wall and the deflecting wall, said separating end being configured, in the deflecting position, to extend radially inward with respect to the inner wall.

3. The air inlet according to claim 2, wherein the separating end comprises a pointed shape.

4. The air inlet according to claim 2, wherein the separating end is configured, in the covering position, to extend adjacent to the downstream end.

5. The air inlet according to claim 1, wherein each of the mobile members comprises a blocking end that connects the covering wall and the deflecting wall, said blocking end being configured to cooperate with the upstream end in the covering position and with the downstream end in the deflecting position.

6. The air inlet according to claim 5, wherein the blocking end is configured to move radially outwards to the inner wall wall between the covering position and the deflecting position.

7. The air inlet according to claim 1, wherein each of the mobile members is mounted mobile around a pivot of pivot axis tangential to the inner wall and belonging to a plane transverse to the longitudinal axis.

8. The air inlet according to claim 7, wherein the mobile member extends on either side of the pivot.

9. An aircraft propulsion unit extending along a longitudinal axis oriented from upstream to downstream and comprising a turbine engine comprising a radially inner primary duct and a radially outer bypass duct configured to guide from upstream to downstream respectively a primary air flow and a bypass air flow during a thrust phase, said turbine engine comprising upstream a fan rotatably mounted about the longitudinal axis, said aircraft propulsion unit comprising thrust inversion means configured to modify the bypass air flow into a reverse air flow circulating from downstream to upstream in the bypass duct during a reverse thrust phase, said nacelle extending outwardly around the turbine engine and comprising at its upstream end an air inlet comprising an inner wall turned towards the longitudinal axis, an outer wall opposite the inner wall and an air inlet lip connecting upstream the inner wall and the outer wall, wherein:

the inner wall defines a plurality of openings comprising an upstream end and a downstream end, and the air inlet comprises a plurality of mobile members, a mobile member of the plurality of mobile members being mounted pivoting in each opening of the plurality of openings, each of the mobile members comprising a covering wall and a deflecting wall opposite the covering wall and being configured to pivot between:

a covering position, wherein the covering wall is turned towards the longitudinal axis, obstructs the opening and extends along the inner wall so as to guide the bypass air flow in order to promote the thrust phase, and a deflecting position, wherein the deflecting wall is turned towards the longitudinal axis, obstructs the opening and is configured to separate the reverse air flow in order to promote the thrust reversal phase.

10. A method for using an air inlet of an aircraft propulsion unit according to claim 1, wherein each of the mobile members is initially in the covering position so as to guide the bypass air flow in order to promote the thrust phase, said method comprising, during the thrust reversal phase, a movement of each of the mobile members in the deflecting position so as to separate the reverse air flow.

11. The air inlet according to claim 3, wherein the pointed shape of the separating end defines an angle of less than 30°.

12. The air inlet according to claim 8, wherein the pivot is mounted closer to the upstream end than to the downstream end of the opening.

13. The aircraft propulsion unit according to claim 9, wherein the fan comprises variable pitch blades so as to form the thrust reversal means.

* * * * *